United States Patent Office 3,733,348
Patented May 15, 1973

3,733,348
NICKEL COMPLEXES FROM AROMATIC OXIMES CONTAINING PHENOLIC GROUPS
Peter James Briggs and Ronald James Hurlock, Manchester, England, assignors to Imperial Chemical Industries Limited, London, England
No Drawing. Original application Oct. 17, 1966, Ser. No. 586,947. Divided and this application Jan. 27, 1969, Ser. No. 807,168
Claims priority, application Great Britain, Oct. 21, 1965, 44,655/65
Int. Cl. C07f 15/04; C08f 45/62
U.S. Cl. 260—439      3 Claims

ABSTRACT OF THE DISCLOSURE

Nickel chelate compounds of substituted orthohydroxy phenyl, substituted orthohydroxy-$\alpha$-naphthyl and substituted orthohydroxy-$\beta$-naphthyl ketoximes are prepared from the ketoxime in which the oxime group is in the syn-position with respect to the group other than the substituted orthohydroxy-phenyl or -naphthyl group by reaction with nickel salts.

---

This is a division of application Ser. No. 586,947, filed Oct. 17, 1966.

This invention relates to the stabilisation of polymers and more particularly to stabilisation by certain metal complexes derived from aromatic oximes containing phenolic groups.

It has now been found that complexes from certain metals and certain aromatic oximes containing phenolic hydroxyl groups wherein a chelate ring is formed containing the oxygen atom of the phenolic hydroxyl group, the nitrogen atom of the oxime group and the metal are valuable stabilisers for polymers against degradation by light.

According to the invention there is provided a process for the stabilisation of polymers against light which comprises incorporating into the polymer a chelate complex of nickel, cobalt or chromium with an aromatic oxime containing a phenolic hydroxyl group.

As polymers which may be stabilised in this way there may be mentioned for example polyolefins such as polyethylene, polypropylene, and poly-4-methylpent-1-ene, polymers such as polyvinyl chloride, polyformaldehyde, and condensation polymers such as polyamides for example polyhexamethyleneadipamide.

The chelate complex may be incorporated into the polymer in any conventional manner, for example by dissolving the chelate complex in a low-boiling solvent and, after thoroughly mixing the solution with the polymer in powder form, evaporating the solvent; or by means of mechanical mixing; or by extrusion compounding.

The chelate complex should be present in the polymer in amount from 0.01 to 5%, and preferably from 0.2 to 1% by weight of the polymer.

The chelate complex may be used alone or may be used in conjunction with other conventional additives to the polymers, for example antioxidants such as phenolic compounds, metal salts or esters of thiodipropionic acid, dialkyl sulphides, salts or esters of dialkyldithiocarbamates, dialkyldithiophosphoric acid or salts or esters thereof, alkyl or aryl phosphites orthophosphates, salts or esters of phosphorus oxy- or thioacids, or esters of boric acid, ultraviolet light absorbers, soaps, plasticisers, antistatic agents, pigments, dyes and fillers.

The incorporation of the chelate complexes of the invention provides a considerable increase in the resistance of the polymer to degradation by light. In many cases the stability so provided is not significantly reduced by treatments such as washing of the stabilised polymer.

As aromatic oximes from which the chelate complexes are derived there may be mentioned oximes of carbonyl compounds of the type for example Ar.CO.Y wherein Ar is an aromatic radical such as phenyl, $\alpha$- or $\beta$-naphthyl which carries a phenolic hydroxyl group in the ortho position to the carbonyl group and may optionally carry other substituents such as a hydrocarbon group for example an alkyl group such as methyl, isopropyl or tert.-butyl, nonyl, lauryl or tert.-octyl, $\alpha$-methylcyclohexyl or phenyl, a halogen atom such as chlorine, an alkoxy group such as methoxy or octyloxy, or a nitro group, and Y is a hydrogen atom or an optionally substituted hydrocarbon radical, such as an alkyl group for example methyl, or $\beta$-hydroxyethyl, a cycloalkyl group for example cyclohexyl, or an aromatic radical for example phenyl, $\alpha$- or $\beta$-naphthyl, substituted phenyl such as hydroxyphenyl, or a heterocyclic radical such as furyl, pyridyl or thienyl.

The phenolic hydroxyl group and the oxime group must be positioned so that chelation is possible, the metal atom replacing the hydrogen atom of the phenolic hydroxyl group and being chelated with the nitrogen atom of the oxime group. The hydroxyl group may for example be in a position ortho to the point of attachment on the aromatic ring of the carbonyl group from which the oxime group is derived and the oxime in the syn-configuration, with respect to Y.

Superior stabilisation effects are in general obtained by the use of chelate complexes derived from ketoximes rather than from aldoximes, i.e. from oximes obtained from carbonyl compounds of the type Ar.CO.Y where Y is not a hydrogen atom, and particularly from ketoximes derived from a carbonyl compound wherein Y is aliphatic or cycloaliphatic, e.g. alkyl, substituted alkyl or cycloalkyl. Superior stabilisation is also in general obtained, especially when Y is chosen from one of the preferred classes of groups, by the use of oximes derived from carbonyl compounds of the formula Ar.CO.Y wherein Ar is a hydroxyl substituted phenyl nucleus rather than for example a hydroxyl substituted naphthyl nucleus.

Particularly effective stabilisation is obtained by the use of cobalt and, especially, nickel chelate complexes.

In the chelate complexes used in the process of the invention one molecular proportion of the metal ion is associated with a number, equal to the valency of the metal, of molecular proportions of the ligand (that is the oxime molecule from which one atom of hydrogen is lost).

Examples of chelate complexes which may be used are nickel bis-complexes, chromium tris-complexes and cobalt tris-complexes of syn-methyl 2-hydroxy-4-methylphenyl ketoximes, syn-phenyl 2-hydroxy-4-heptoxyphenyl ketoxime, syn-2-hydroxynaphthylaldoxime, syn-methyl 2-hydroxy-5-tert.-octylphenyl ketoxime, syn-phenyl 2-hydroxynaphthyl ketoxime, syn-methyl 2-hydroxy-5-methylphenyl ketoxime syn-methyl 2-hydroxyl-5-nitrophenyl ketoxime.

Some of the chelate complexes of particular value in the process of the invention are new compounds and represent a further feature of the invention according to which there are provided as new compositions of matter chelate complexes of nickel, cobalt or chromium with aromatic ketoximes containing a phenolic hydroxyl group.

The chelate complexes may be prepared by any conventional means employed in the manufacture of chelate complexes in general. For example a solution of a salt of the metal is reacted with the aromatic oxime in appropriate proportions, that is so that there is used a molar ratio of oxime to metal salt approximately equal to the valency of the metal in the salt. The reaction is preferably carried out in a solvent such as ethanol or water, the reaction mixture being heated if necessary. The chelate complex is then isolated in conventional manner, for example by filtration in the usual case where it is insoluble in the solvent.

Suitable salts to be used in preparation of the chelate complex are the acetate, chloride, sulphate or nitrate. In those cases in which a suitable salt of the metal in the desired valency state cannot conveniently be used the salt may be prepared in situ from a salt of the metal in another valency state, for example cobaltous salts are used in presence of hydrogen peroxide to furnish cobalt tris-complexes.

Two or more of the chelate complexes may be used in conjunction in the process of the invention and, particularly when derived from different metals such as nickel and cobalt, may show a synergistic effect leading to enhanced stability of the polymer.

The invention is illustrated but not limited by the following examples in which all parts and percentages are by weight.

EXAMPLE 1

Polypropylene is blended with 0.1% of 1,1,3-tris-(2-methyl-4-hydroxy-5-tert.-butylphenyl)butane, 0.5% of dilaurylthiodipropionate, 0.4% of calcium stearate and 0.2–0.5% of metal complex and spun at 195° C. The yarns are then exposed to the light from a 1000 watt xenon-arc and the strengths of the yarns determined after various periods of exposure and compared with the results obtained using a commercial UV stabiliser (2 - hydroxy-4-octyloxybenzophenone).

The results are shown in Table I:

TABLE I

| Stabilizer | Concentration, percent | Percent strength retained after 874 hours |
|---|---|---|
| Nickel syn-methyl 2-hydroxy-4-methylphenyl ketoxime | 0.5 | 100 |
| Do | 0.2 | 83 |
| 2-hydroxy-4-octylbenzophenone | 0.5 | 64 |

The chelate complex used above is prepared as follows:

A solution of 24.8 parts of nickel acetate in 500 parts of ethanol is added to a solution of 33 parts of syn-methyl-2-hydroxy-4-methylphenyl ketoxime in 90 parts of ethanol. The nickel complex is precipitated immediately. The reaction mixture is heated at the boil for 1 hour and after cooling the product is filtered off, washed with 20 parts of ethanol and dried. 37 parts of the nickel complex are obtained.

The chelate complex may also be prepared from nickel sulphate and the sodium salt of 2-hydroxy-4-methylphenyl ketoxime in water, the insoluble complex being isolated as above.

By either of the above procedures the nickel complexes used in the following examples may be prepared.

In the case of the cobalt tris-complexes the following general procedure may be used:

A solution of 8.3 parts of cobaltous acetate in 160 parts of methanol is mixed with a solution of 16.5 parts of syn-methyl 2 - hydroxy-5-methylphenyl ketoxime in 100 parts of methanol. 10 parts of aqueous hydrogen peroxide (100 volume) are added slowly and the solution is heated to the boiling point and maintained at that temperature for 18 hours. The solution is cooled and the insoluble complex isolated by filtration, washed with methanol and dried at 100° C.

EXAMPLE 2

Polypropylene is blended, as in Example 1, with 0.1% of 1,1,3 - tris(2-methyl-4-hydroxy-5-tert.-butylphenyl)butane, 0.5% diphenyl iso-octylphosphite (mix A) or 0.5% trilauryltrithiophosphite (mix B), 0.5% of nickel syn-methyl-2-hydroxy-4-methylphenyl ketoxime and 0.4% of calcium stearate and spun at 195° C. The yarns are exposed to the xenon-arc as before.

| Mix— | Percent strength retained after 874 hours |
|---|---|
| A | 100 |
| B | 88 |

EXAMPLE 3

Polypropylene is blended with 0.1% of 1,1,3-tris(2-methyl - 4-hydroxy-5-t-butylphenyl)butane, 0.5% of trilauryltrithiophosphte, 0.4% of calcium stearate and 0.5% of stabiliser, and spun at 210° C. and draw ratio 4:1. The resulting yarns are then exposed to a 1000 watt xenon arc lamp or to daylight under glass. The average toughness of the yarns, defined as tenacity (gm./den.) $\times$ % extension at break$\times 2 \times 10^{-2}$, is determined before and after exposure.

TABLE II

| Stabiliser | Percent toughness retained after 900 hours exposure to xenon arc | 9 weeks exposure in daylight |
|---|---|---|
| None | 20 | 47 |
| 2-hydroxy-4-octyloxybenzophenone | 32 | 49 |
| Nickel bis(syn-methyl-2-hydroxy-4-methylphenyl ketoxime) | 73 | 82 |

EXAMPLE 4

Polypropylene is blended with 0.1% of 1,1,3-tris(2-methyl-4-hydroxy-5-t-butylphenyl)butane, 0.5% of dilauryl thiodipropionate, 0.4% of calcium stearate and 0.5% of stabiliser, and spun at 225° C. and draw ratio 4:1. The resulting yarns are then exposed to a 1000 watt xenon-arc and to daylight under glass. The average toughness of the yarns, defined as tenacity (gm./den.) $\times$ percent extension at break$\times 2 \times 10^{-2}$, is determined before and after exposure.

TABLE III

| Stabiliser | Percent toughness retained after 600 hours exposure to xenon arc | 68 days exposure in daylight |
|---|---|---|
| None | 13.3 | 2 |
| 2-hydroxy-4-octyloxybenzophenone | 24.1 | 13 |
| Nickel bis(syn-methyl-2-hydroxy-5-methylphenyl ketoxime) | 86.5 | 69 |
| Nickel bis(syn-methyl-2-hydroxy-5-chlorophenyl ketoxime) | 69.7 | 61 |
| Nickel bis(syn-methyl-2-hydroxy-5-nitrophenyl ketoxime) | 44.7 | 10 |
| Nickel bis(syn-phenyl-2-hydroxy-5-chlorophenyl ketoxime) | 56.2 | 34 |
| Nickel bis(syn-methyl-2-hydroxynaphthyl ketoxime) | 37.1 | 16 |

EXAMPLE 5

Polypropylene is blended with 0.1% of 1,1,3-tris(2-methyl-4-hydroxy-5-t-butylphenyl)butane, 0.4% of calcium stearate, 0.5% of a hydroperoxide decomposer and 0.5% of stabiliser, spun at 190° C., and draw ratio 8:1. The resulting yarns are then exposed outdoors on aluminium frames inclined at an angle of 45° to the vertical facing south in Florida.

TABLE IV

| Stabiliser | Hydroperoxide decomposer | Percent strength retained after 4 months |
|---|---|---|
| Nickel bis(syn-methyl-2-hydroxy-4-methylphenyl ketoxime) | Dilauryl thiodipropionate | 93 |
| Do | Diphenyl iso-octyl phosphite | 93 |
| Do | Trilauryl trithiophosphite | 50 |
| 2-hydroxy-4-octyloxybenzophenone | do | 40 |

EXAMPLE 6

Polypropylene is blended with 0.1% of nickel bis(syn-methyl 2-hydroxy-4-methylphenyl ketoxime, 0.25% of hydroperoxide decomposer and 0.4% of calcium stearate, and spun at 190° C. and draw ratio 8:1. The resulting yarns are exposed to a 1000 watt xenon-arc lamp and the tensile strengths of the yarns measured before and after exposure.

TABLE V

| Hydroperoxide decomposer: | Percent strength retained after 269 hours exposure |
|---|---|
| Dilaurylthiodipropionate | 45 |
| Trilauryltrithiophosphite | 43 |
| Zinc dibutyl dithiocarbamate | 87 |
| Zinc di-isopropyldithiophosphate | 60 |

EXAMPLE 7

Polypropylene is blended with 0.1% of 1,1,3-tris(2-methyl-4-hydroxy-5-t-butylphenyl)butane, 0.5% of dilauryl thiodipropionate, 0.4% of calcium stearate and 0.5% of stabiliser, and spun at 190° C. and draw ratio 8:1. The resulting yarns are then exposed to a 1000 watt xenon-arc lamp, and the tensile strengths of the yarns determined before and after exposure.

TABLE VI

| Stabiliser: | Percent strength retained after 787 hours exposure |
|---|---|
| Cobalt tris(salicylaldoxime) (A) | 43 |
| Nickel bis(salicylaldoxime) (B) | 61 |
| 0.25% of A+0.25% of B | 67 |

EXAMPLE 8

Polypropylene is blended with 0.1% of 1,1,3-tris(2-methyl-4-hydroxy-5-t-butylphenyl)butane, 0.5% of dilauryl thiodipropionate, 0.4% of calcium stearate and 0.5% of stabiliser, and spun at 225° C. and draw ratio 4:1. The resulting yarns are then exposed to 1000 watt xenon-arc lamp, and the average toughness of the yarns determined before and after exposure.

TABLE VII

| UV-stabiliser: | Percent toughness retained after 600 hours exposure |
|---|---|
| Nickel bis(syn-methyl 2-hydroxy-4-methylphenyl ketoxime) | 52.8 |
| Chromium tris(syn-methyl-2-hydroxy-methylphenyl ketoxime) | 29.2 |
| Chromium tris(syn-methyl 2-hydroxy-5-chlorophenyl ketoxime) | 18.1 |
| Control without stabilisers | 13.3 |

The chromium tris(syn-methyl 2-hydroxy-4-methylphenylketoxime) used above is prepared by heating at 100° C. with stirring for 18 hours a mixture of 24.8 parts of syn-methyl 2-hydroxy-4-methylphenyl ketoxime, 6.65 parts of chromic chloride (hexahydrate) and 50 parts of urea. After cooling the chelate complex is collected by filtration, ground to a powder, washed thoroughly with water, and dried at 60° C.

By a similar procedure the chromium tris(syn-methyl 2-hydroxy-5-chlorophenyl ketoxime) is prepared from the corresponding ketoxime.

EXAMPLE 9

The procedure of Example 7 is repeated using the stabilisers listed below. The strength retentions after 458 hours exposure are determined.

TABLE VIII

| Stabiliser: | Percent strength retention |
|---|---|
| Nickel bis(syn-methyl 2-hydroxy-4-methylphenyl ketoxime) | 89 |
| Nickel bis(syn-methyl 2,4-dihydroxyphenyl ketoxime) | 26 |
| Nickel bis(syn-methyl 2-hydroxy-3-t-butyl-5-methylphenyl ketoxime) | 82 |
| Nickel bis(syn-phenyl 2-hydroxy-5-chlorophenyl ketoxime) | 32 |

EXAMPLE 10

The procedure of Example 9 is repeated using the stabilisers listed below.

TABLE IX

| Stabiliser: | Percent strength retention |
|---|---|
| Nickel bis(syn-methyl 2-hydroxy-4-methylphenyl ketoxime) | 95 |
| Nickel bis(syn-methyl 2-hydroxy-5-methylphenyl ketoxime) | 76 |
| Nickel bis(syn-methyl 2-hydroxyphenyl ketoxime) | 92 |

EXAMPLE 11

Polypropylene films ($5 \times 10^{-3}$ in. thickness) containing 0.5% of stabiliser, 0.5% of dilauryl thiodipropionate and 0.1% of 1,1,3-(2-methyl-4-hydroxy-5-t-butylphenyl) butane are immersed in trichloroethylene at room temperature for various times. The concentration of stabiliser remaining in the polypropylene is monitored by UV absorption spectra, optical densities being measured at the maximum of this stabiliser. The results indicate the superior wash-fastness of the nickel complexes over a commercial UV stabiliser.

TABLE X

| Stabiliser | $\lambda_{max.}$ (m$\mu$) | Optical density after immersion for— | | | Background optical density |
|---|---|---|---|---|---|
| | | 0 min. | 5 min. | 10 min. | |
| Nickel bis(syn-phenyl 4-dodecyloxy-2-hydroxyphenyl ketoxime) | 380 | 0.65 | 0.66 | 0.70 | 0.3 |
| Nickel bis(syn-phenyl 4-heptyloxy-2-hydroxyphenyl ketoxime) | 380 | 0.83 | 0.63 | 0.53 | 0.3 |
| 2-hydroxy-4-octyloxybenzophenone | 325 | 1.9 | 0.3 | | 0.15 |

The preceding Example 9 is repeated with the nickel complex stabiliser used above.

TABLE XI

| Stabiliser | Percent strength retention after exposure to 1,000-watt xenon-arc lamp for— | |
|---|---|---|
| | 513 hours | 782 hours |
| Nickel bis(syn-phenyl 4-dodecyloxy-2-hydroxyphenyl ketoxime) | 64 | 53 |
| Nickel bis(syn-phenyl 4-heptyloxy-2-hydroxyphenyl ketoxime) | 79 | 63 |

EXAMPLE 12

The extraction resistance of polypropylene yarns containing 0.5% of stabiliser, 0.5% of dilauryl thiodipropionate, 0.1% of 1,1,3-tris(2-methyl-4-hydroxy-5-t-butylphenyl)butane and 0.4% of calcium stearate is measured by assessing the residual stabilisation, as indicated by tensile strength retained after exposure to xenon-arc, after the wash treatments described below.

(a) 20 minute wash in aqueous solution of an alkylphenol/ethylene oxide condensate (2 g./l.) at 60° C. and water rinse.

(b) 30 minute immersion in trichloroethylene and rinse.

The stabilisers used are:

(A) Nickel bis (syn-methyl 2-hydroxy-4-methylphenyl-ketoxime).

(B) 2-hydroxy-4-octyloxybenzophenone.

TABLE XI

| Wash treatment | Stabiliser | Tensile strength (in g./denier) after exposure to 1,000-watt xenon arc lamp | |
|---|---|---|---|
| | | 156 hours | 344 hours |
| None | A | 4,100 | 4,250 |
| | B | 4,300 | 3,250 |
| (a) | A | 4,450 | 4,200 |
| | B | 4,200 | 2,400 |
| (b) | A | 4,100 | 2,000 |
| | B | 3,650 | 1,150 |

EXAMPLE 13

Polyhexamethyleneadipamide containing 2% of titanium dioxide is blended with 0.1% of stabiliser, 0.05% of 1,1,3-tris(2-methyl-4-hydroxy-5-t-butylphenyl)butane and 0.1% of trilauryltrithiophosphite and spun on a gravity melter. The resulting yarns are given a typical commercial finishing treatment (heat-setting at 200° C. for 30 seconds on a threadline apparatus, chlorite-bleaching and bisulphite clearing) and exposed to a 1000 watt xenon-arc lamp for 24 hours and the tensile strength of the yarns measured before and after exposure.

TABLE XIII

Stabiliser: Percent loss in strength
Nickel bis(syn-methyl - 2 - hydroxy-4-methylphenyl ketoxime) _____ 35.8
2-hydroxy-4-t-octyloxybenzophenone _____ 36.4
0.005% of manganous acetate (commercially used stabiliser) _____ 43.5

EXAMPLE 14

Poly-4-methylpentene-1 is blended with 0.5% of stabiliser, 0.25% of 2,6-di-t-butyl-4-methylphenol and 0.25% of 3,5-di-t-butyl - 4 - hydroxybenzyl-di-n-octadecylphosphonate and extruded at 280° C. 0.02" thick plaques are then exposed to a 1000 watt xenon-arc lamp. The time in hours necessary to absorb 0.1% of oxygen is determined by infra-red spectroscopic measurements on the rate of formation of carbonyl groups as shown by carbonyl absorption bands.

TABLE XIV

Stabiliser: Hours
None _____ 700
2-hydroxy-4-octyloxybenzophenone _____ 950
Nickel-bis(syn-methyl - 2 - hydroxy-4-methylphenyl ketoxime) _____ 1300

EXAMPLE 15

100 parts of polyvinyl chloride are blended with 2 parts of a commercial alkyl thio tin stabiliser, 1 part of ethyl palmitate (a lubricant) and 0.1 part of stabiliser. Sheets are moulded at 150° C. and exposed to daylight under glass. The change in colour is monitored against the Standard Wool Blue scale (B.S. 1006: 1955), which gives ratings of 1–8, 1 being a large change and 8 the minimum change in colour.

TABLE XV

Stabiliser: Colour change rating
None _____ 5
Nickel bis(syn-methyl 2-hydroxy-4-methylphenyl ketoxime) _____ 7

EXAMPLE 16

100 parts of polyvinyl chloride are blended with 4 parts of dibasic lead phosphite, 1 part of ethyl palmitate and 0.1 part of stabiliser. Sheets are moulded at 150° C. and exposed to daylight under glass, the change in colour being compared against the Standard Wool Blue scale.

TABLE XVI

Stabiliser: Colour change rating
None _____ 5–6
Nickel bis(syn-methyl-2-hydroxy-4-methylphenyl ketoxime) _____ 7

We claim:
1. A chelate complex of an aromatic oxime containing a phenolic hydroxyl group with nickel replacing the hydrogen atom of the phenolic hydroxyl group and being chelated with the nitrogen atom of the oxime group, said aromatic oxime moiety being derived from a ketoxime of the formula

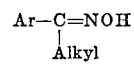

wherein Ar represents a member selected from the class consisting of substituted orthohydroxy phenyl, substituted orthohydroxy-α-naphthyl and substituted orthohydroxy-β-naphthyl wherein the substituent on the phenyl and naphthyl moieties is selected from the class consisting of alkyl, alkoxy and halogen.

2. The chelate complex of claim 1 wherein Ar is substituted orthohydroxy phenyl and the substituent on the phenyl moiety is methyl at the 4 position thereof.

3. The chelate complex of claim 1 wherein Ar is substituted orthohydroxy phenyl and the substituent on the phenyl moiety is methyl at the 5 position thereof.

References Cited

UNITED STATES PATENTS

| | | | |
|---|---|---|---|
| 2,615,860 | 10/1952 | Burgess | 260—439 XR |
| 3,107,232 | 10/1963 | Matlack | 260—439 XR |
| 3,224,873 | 12/1965 | Swanson | 260—429 JU |
| 3,294,842 | 12/1966 | Swanson | 260—566 |

FOREIGN PATENTS 799,742  8/1958  Great Britain _____ 260—429 J

OTHER REFERENCES

Chemical Abstracts, vol. 53, p. 2637 (1959).
Martell et al., Chemistry of the Metal Chelate Compounds, Prentice-Hall, Inc., New York (1953), pp. 67, 227 and 228.
Dwyer et al., Chelating Agents and Metal Chelates, Academic Press, New York, (1964), p. 119.

TOBIAS E. LEVOW, Primary Examiner
H. M. S. SNEED, Assistant Examiner

U.S. Cl. X.R.
260—346.1, 270, 329, 45.75, 438.5